Patented Apr. 26, 1938

2,115,679

UNITED STATES PATENT OFFICE 2,115,679

METHOD OF REFINING ROSIN

Leavitt N. Bent, Holly Oak, Del., assignor to Hercules Powder Company, Wilmington, Del., a corporation of Delaware No Drawing. Application October 7, 1935, Serial No. 43,985

18 Claims. (Cl. 87—2)

My invention relates to a method of refining rosin, and more particularly to a method whereby color bodies may be removed from rosin.

As is well known, both wood and gum rosin contain visible color bodies which darken the rosin and, where present in any substantial quantity, substantially limit the use of the rosin.

Further, wood rosin in addition to visible color bodies usually contains certain color bodies which, while normally invisible or latent, under certain conditions become dark and color the rosin or product in which it is contained. The normally invisible or latent color bodies will, for example, darken in the presence of air and alkali, and hence will operate to darken, for example, soaps, sizes, limed varnishes and the like, in which wood rosin may be included as an ingredient.

The presence of visible color bodies in rosin and the presence of latent color bodies more particularly in wood rosin, where present in any substantial quantity, limit the use of rosin in various arts and hence various methods, of varying degrees of efficiency, have been developed for the removal of such color bodies from rosin, and especially from wood rosin, in order to increase its scope of use and in order to effect the refinement of low grade rosin, or rosin containing substantial quantities of visible and/or latent color bodies.

One of the methods for the removal of color bodies from rosin used by the prior art involves dissolving rosin in a suitable solvent, such as gasoline, treating this solution with a selective solvent for the color bodies in the rosin which is immiscible therewith, and then separating the refined rosin. Resorcinol has been shown by the prior art to be a useful selective solvent for the color bodies of rosin, and it has been shown that the addition of an acid, such as sulfuric, phosphoric, acetic, oxalic, salicylic, citric or tartaric acid, to resorcinol improves its selective solvent action. The action of these acids in improving the selective solvent action of resorcinol appears to depend on their property of dissociating to produce hydrogen ions, since this is the only property which is common to the group listed.

Now, I have made the discovery that an admixture of resorcinol and another material other than resorcinol, which is also a selective solvent for the color bodies of rosin, is a more effective selective solvent for the color bodies of rosin than either material used alone. Furthermore, such a mixture is more effective than could be predicated as an additive result of the selective solvent action of the ingredients per se.

This discovery is an entirely distinct and separate phenomenon from the action of acids in enhancing the selective solvent action of resorcinal shown by the prior art, since the selective color-body solvents which I use in admixture with resorcinol are incapable of dissociating to produce hydrogen ions to more than a very slight extent, if at all. Furthermore, the prior art addition of acids to resorcinol is in no way suggestive of my discovery, since the acids admixed with resorcinol by the prior art are not selective solvents per se for the color bodies of rosin, and only one of them can in any way be made a selective solvent. The exception is oxalic acid, which in ethyl alcohol solution is a selective solvent for the color bodies of rosin.

The method in accordance with my invention involves the treatment of rosin containing visible color bodies, and in the case more particularly of wood rosin, also latent color bodies, with a substance having a capacity for selectively dissolving color bodies in rosin and incapable of substantial dissociation to produce hydrogen ions, i. e., having a hydrogen ion dissociation constant less than about $1 \times 10^{-5}$, in admixture with resorcinol, which likewise has a capacity for selectively dissolving color bodies from rosin. The substance in admixture with resorcinol will be one normally a liquid or in liquid form as, for example, dissolved in a solvent, and generally will not react with resorcinol, but will function in admixture therewith as an independent selective solvent for the color bodies of rosin, though in some cases slight reaction may occur.

The proportions of resorcinol and substance indicated may vary widely and, if desired, they may be in proportion to form a eutectic mixture, when such may be formed.

In carrying out the treatment, the rosin is desirably treated in solution in a suitable solvent therefor which is immisible with the mixture, and the treatment involves essentially contacting the mixture with the rosin, or the rosin solution, to permit the mixture to extract color bodies from the rosin by selectively dissolving the color bodies therefrom. The treatment may be carried out, for example, by admixing a solution of rosin with the mixture and subsequently separating the rosin solution from the mixture and the color bodies dissolved thereby by gravity. It may likewise be carried out by refluxing rosin in solution with the mixture and subsequently separating, or it may be carried out by dissolving rosin directly in the mixture, by the application of heat, if necessary, and subsequently precipitating the refined rosin from the mixture as, for example, by partial evaporation of the rosin solvent, by the addition of a non-solvent of rosin to the mixture, or by reducing the temperature, etc.

Where rosin is treated in solution in a suitable solvent, it is essential that the substance associated with resorcinol be immiscible, or capable of being rendered immiscible with the solvent for rosin, as by a reduction in temperature. It is likewise essential that the rosin solvent be immiscible or capable of immiscibility with resorcinol. On the other hand, where the rosin is treated by dissolving it directly in the mixture, the characteristic of immiscibility with the rosin solvent is not essential to the substance used with the resorcinol.

Examples of selective solvents for the color bodies of rosin, suitable for use in admixture with resorcinol in the practical adaptation of the method of my invention, are furfural; a phenol, as ordinary phenol, o-cresol; furfuryl alcohol; a chlorohydrin as ethylene chlorohydrin; aniline; methyl thiocyanate; a metallic halide, as tin chloride or zinc chloride, in a suitable solvent such as ethyl alcohol; an alkali metal acetate or propionate, in a suitable solvent such as ethyl alcohol, etc.

It will be understood that a solution of a metallic halide as tin chloride or zinc chloride in suitable solvent, such as ethyl alcohol, is a selective color-body solvent, and that in certain cases, as with zinc chloride, where the metallic halide is soluble in resorcinol, the use of an additional solvent is unnecessary. Likewise, it will be understood that the solution of an alkali metal acetate or propionate, in a suitable solvent, is a selective color-body solvent, and that where the salt is soluble in resorcinol, as in the case of sodium acetate, resorcinol can be used as the solvent. When resorcinol is used as the solvent for metallic halide or the alkali metal acetate or propionate, it acts as a solvent for the color bodies of rosin and at the same time acts as a solvent for the added compound, placing it in liquid form, so that it can also act as a color-body solvent.

As a suitable solvent for rosin where the rosin is to be treated in solution, I may use, for example, gasoline, petroleum ether, pinene, dipentene, etc.

In carrying out the method embodying my invention, a solution of rosin in a suitable solvent, as gasoline, is prepared containing, say, about 12% rosin, or for example, a solution of rosin such as is obtained by extracting pine wood chips with a suitable solvent, as gasoline, is washed, or, if desired, refluxed at, say, a temperature of about 100° C.–120° C., with a mixture containing a substance having a capacity for dissolving color bodies in the rosin and immiscible, or capable of being rendered immiscible with the rosin solvent and resorcinol in amount within about the range 5%–95% by weight. By way of illustration, where phenol is used with the resorcinol, the phenol may be present in the mixture in amount from about 5% to 95% by weight, or more desirably within about the range 10%–50% by weight, and where, for example, furfural is used, the furfural may be present in amount from about 5%–95% by weight, or more desirably within about the range 10%–50% by weight.

Where it is desired to use a eutectic mixture, such will be formed, when using, for example, phenol, by a mixture of 20% resorcinol and 80% phenol, when using o-cresol, by a mixture of 10% resorcinol and 90% o-cresol, etc., the requisite proportions of resorcinol and the other substance, when such will form a eutectic mixture therewith being readily determined.

As illustrative of the practical adaptation of the method embodying my invention, for example, 500 parts of a solution of rosin in gasoline containing about 12% rosin is refluxed at a temperature of about 65° C. with a mixture containing resorcinol within about the range 95%–5% and phenol within about the range 5%–95%. The refluxing is desirably continued for a period of about two hours, after which the rosin-gasoline solution is separated by settlement, say, at room temperature, i. e., 20° C.–30° C. from the resorcinol-phenol mixture and color bodies dissolved therein. Refined rosin is then recovered from the gasoline-rosin solution by evaporation off of the gasoline. The rosin recovered will grade H+ to I and will be of a pale color. The refined rosin will be of a paler color than that obtained by similar treatment with either resorcinol or phenol alone.

As a further illustration, for example, 1,000 parts of gasoline-rosin solution containing about 15% rosin is refluxed with 120 parts of a mixture comprising 50% resorcinol and 50% phenol for about two hours. After separation of the gasoline-rosin solution from the resorcinol-phenol mixture, by settlement at room temperature, the gasoline-rosin solution is given three washes, each with 170 parts of 80% alcohol by volume in order to remove residual resorcinol. On evaporation off of the gasoline from the gasoline-rosin solution, about 100 parts of rosin grading I in color will be obtained. With similar procedure, using 120 parts of a mixture of 90 parts of resorcinol and 30 parts of phenol about 107 parts of rosin, grading I in color, will be obtained.

As illustrative of the practical adaptation of my invention using a eutectic mixture, for example, 500 parts of a gasoline-rosin solution, containing about 15% rosin, is refluxed with 60 parts of a mixture of 20% resorcinol and 80% phenol for about 2 hours. The gasoline-rosin solution is then separated from the resorcinol-phenol mixture and color bodies dissolved therein, the gasoline-rosin solution washed, if desired, and the refined rosin recovered from the gasoline.

In the practical adaptation of the method embodying my invention, furfural, and the like, may be substituted for phenol in the above illustrations; thus, for example, the rosin solution may be treated with a mixture of equal parts of furfural and resorcinol to obtain a yield of rosin grading I in color.

By way of further illustration, for example, 50–50% mixtures of resorcinol and aniline or furfuryl alcohol, or ethylene chlorohydrin, or methyl thiocyanate, or a 50% solution of tin chloride in ethyl alcohol may be used for refining wood or gum rosin with results very substantially greater than can be obtained using any of the ingredients of the mixtures alone. Likewise, 66⅔–33⅓% mixtures of resorcinol and sodium acetate or zinc chloride, in which the sodium acetate or zinc chloride is dissolved directly in the resorcinol, are better selective solvents than any one of these materials alone, and better than the sodium acetate or the zinc chloride in solution in an ordinary solvent, such as ethyl alcohol.

For example, say 60 grams of any of the above mixtures may be mixed with, say, 500 grams of a 14% solution of FF wood rosin in gasoline, where necessary the mixture being heated to obtain a homogeneous solution of the resorcinol in the other solvent before admixture with the rosin solution. The selective solvent mixture and rosin solution are contacted by shaking in a separating funnel. After desired contact, the selective solvent mixture and dissolved color bodies are separated by gravity and the refined rosin recovered from the rosin solution by evaporation off of the gasoline.

It will now be understood that, in accordance with my invention, I have provided a method for the refining of rosin by the removal of color bodies therefrom involving essentially the use of resorcinol in admixture with another substance incapable of substantial dissociation to produce hydrogen ions, i. e., having a hydrogen ion dissociation constant not greater than $1.0 \times 10^{-5}$, normally a liquid or in liquid form, and having a capacity for selectively dissolving color bodies contained in rosin and, where the rosin is treated in solution, being immiscible or capable of being rendered immiscible with the solvent used to form the rosin solution, as, for example, furfural; a phenol, as ordinary phenol, o-cresol; furfuryl alcohol; a chlorohydrin as ethylene chlorohydrin; aniline; methyl thiocyanate; a metallic halide, as tin chloride or zinc chloride, in a suitable solvent as ethyl alcohol; an alkali metal acetate, or propionate, in a suitable solvent, etc.

It will be understood that, according to this invention, both the resorcinol and the substance admixed therewith operate as selective solvents for color bodies in rosin, and that acting in conjunction they effect a greater extraction of color bodies than can be obtained with the use of either resorcinol or the substance alone.

It will be further understood that where the substance used with resorcinol is not normally in liquid form, it will be in liquid form within the purview of this invention and the claims therefor, if it be dissolved in the resorcinol or admixed therewith in a suitable solvent, or otherwise liquefied.

This application is filed as a continuation in part of the application filed by me for Method of refining rosin, Serial No. 661,839, filed March 20, 1933, which is in turn a continuation in part of an application filed by me for Method of refining rosin, Serial No. 464,103, filed June 26, 1930.

What I claim and desire to protect by Letters Patent is:

1. The method of refining rosin by the extraction of color bodies therefrom which includes subjecting rosin to treatment with a mixture containing resorcinol and a substance other than resorcinol in liquid form and having a hydrogen ion dissociation constant less than $1.0 \times 10^{-5}$, said substance having a capacity for selectively dissolving color bodies contained in the rosin, and separating refined rosin from the mixture and the color bodies dissolved thereby.

2. The method of refining rosin by the extraction of color bodies therefrom which includes subjecting rosin in solution in a solvent to treatment with a mixture containing resorcinol and a substance other than resorcinol in liquid form and having a hydrogen ion dissociation constant less than $1.0 \times 10^{-5}$, said substance having a capacity for selectively dissolving color bodies contained in the rosin, and said mixture being capable of immiscibility with the solvent for the rosin, separating the mixture and color bodies dissolved therein from the rosin-solvent solution and separating refined rosin from the rosin-solvent solution.

3. The method of refining rosin by the extraction of color bodies therefrom which includes subjecting rosin to treatment with a mixture containing resorcinol and an organic substance other than resorcinol in liquid form and having a hydrogen ion dissociation constant less than $1.0 \times 10^{-5}$, said organic substance having a capacity for selectively dissolving color bodies contained in rosin, and separating refined rosin from the mixture and color bodies dissolved thereby.

4. The method of refining rosin by the extraction of color bodies therefrom which includes subjecting rosin to treatment with a mixture containing resorcinol and an inorganic substance in liquid form and having a hydrogen ion dissociation constant less than $1.0 \times 10^{-5}$, said inorganic substance having in liquid form a capacity for selectively dissolving color bodies contained in the rosin, and separating refined rosin from the mixture and color bodies dissolved thereby.

5. The method of refining rosin by the extraction of color bodies therefrom which includes subjecting rosin to treatment with a mixture containing a substance other than resorcinol in liquid form and having a hydrogen ion dissociation constant less than $1.0 \times 10^{-5}$, said substance having a capacity for dissolving color bodies contained in rosin, and resorcinol in amount within about the range 95%–5%, and separating refined rosin from the mixture and the color bodies dissolved thereby.

6. The method of refining rosin by the extraction of color bodies therefrom which includes subjecting rosin in solution in a suitable solvent to treatment with a mixture containing a substance other than resorcinol in liquid form and having a hydrogen ion dissociation constant less than $1.0 \times 10^{-5}$, said substance having a capacity for dissolving color bodies contained in rosin, and resorcinol in amount within about the range 95%–5%, said mixture being capable of immiscibility with the rosin solvent, separating rosin-solvent solution from the mixture and color bodies dissolved therein, and separating refined rosin from the rosin-solvent.

7. The method of refining rosin by extraction of color bodies therefrom which includes subjecting rosin in solution in gasoline to treatment with a mixture containing a substance other than resorcinol in liquid form and having a hydrogen ion dissociation constant less than $1.0 \times 10^{-5}$, said substance having a capacity for selectively dissolving color bodies contained in rosin, and resorcinol in amount within about the range 95%–5%, the said mixture being capable of immiscibility with the rosin solvent, separating rosin-gasoline solution from the mixture and color bodies dissolved therein, and separating refined rosin from the gasoline.

8. The method of refining rosin by the extraction of color bodies therefrom which includes subjecting rosin to treatment with a eutectic mixture of resorcinol and a substance other than resorcinol in liquid form and having a hydrogen ion dissociation constant less than $1.0 \times 10^{-5}$, said substance having a capacity for selectively dissolving color bodies contained in the rosin, and separating refined rosin from the mixture and the color bodies dissolved thereby.

9. The method of refining rosin by the extraction of color bodies therefrom which includes subjecting rosin to treatment with a mixture containing resorcinol and phenol, and separating refined rosin from the mixture and color bodies dissolved therein.

10. The method of refining rosin by the extraction of color bodies therefrom which includes subjecting rosin in solution in a suitable solvent to treatment with a mixture containing resorcinol and phenol, separating rosin-solvent solution from the mixture and color bodies dissolved therein, and separating refined rosin from the rosin solvent.

11. The method of refining rosin by the extraction of color bodies therefrom which includes subjecting rosin to treatment with a mixture containing phenol in amount within about the range 95%–5% and resorcinol in amount within about the range 5%–95%, and separating refined rosin from the mixture and color bodies dissolved therein.

12. The method of refining rosin by the extraction of color bodies therefrom which includes subjecting rosin to treatment with a mixture containing phenol in amount within about the range 50%–10% and resorcinol in amount within about the range 50%–90%, and separating refined rosin from the mixture and color bodies dissolved therein.

13. The method of refining rosin by the extraction of color bodies therefrom which includes subjecting rosin to treatment with a mixture containing resorcinol and furfural, and separating refined rosin from the mixture and the color bodies dissolved therein.

14. The method of refining rosin by the extraction of color bodies therefrom which includes subjecting rosin in solution in a suitable solvent to treatment with a mixture containing resorcinol and furfural, separating the rosin-solvent solution from the mixture and color bodies dissolved therein, and separating refined rosin from the rosin solvent.

15. The method of refining rosin by extraction of color bodies therefrom which includes subjecting rosin to treatment with a mixture containing resorcinal in amount within about the range 95%–5% and furfural in amount within about the range 5%–95%, and separating refined rosin from the mixture and color bodies dissolved therein.

16. The method of refining rosin by extraction of color bodies therefrom which includes subjecting rosin to treatment with a mixture containing resorcinol and tin chloride in solution in a solvent therefor, and separating refined rosin from the mixture and color bodies dissolved therein.

17. The method of refining rosin by extraction of color bodies therefrom which includes subjecting rosin in solution to treatment with a mixture containing resorcinol and tin chloride in solution in a solvent therefor, separating rosin-solvent solution from the mixture and color bodies dissolved therein, and separating refined rosin from the rosin solvent.

18. The method of refining rosin by extraction of color bodies therefrom which includes subjecting rosin in solution in gasoline to treatment with a mixture containing resorcinol and tin chloride in solution in ethyl alcohol, separating the rosin-gasoline solution from the mixture and color bodies dissolved therein, and separating refined rosin from the gasoline.

LEAVITT N. BENT.